United States Patent
Oelsch

(10) Patent No.: US 6,362,931 B2
(45) Date of Patent: *Mar. 26, 2002

(54) DRIVE APPARATUS FOR HARD DISC MEMORIES WITH AN INTEGRATED LABYRINTH SEAL

(75) Inventor: Juergen Oelsch, Hohenroth (DE)

(73) Assignee: Precision Motors Deutsche Minebea GmbH, Villingen-Schwenningen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/041,612

(22) Filed: Mar. 12, 1998

(30) Foreign Application Priority Data

Mar. 12, 1997 (DE) .......................... 197 09 996

(51) Int. Cl.$^7$ .............................. G11B 17/02; H02K 7/08
(52) U.S. Cl. .................... 360/99.08; 310/90; 310/67 R
(58) Field of Search .......................... 360/99.08, 97.02, 360/98.07, 99.04; 310/90.67 R

(56) References Cited

U.S. PATENT DOCUMENTS

| 4,980,587 A | 12/1990 | Yonei et al. ............... 310/67 R |
| 5,381,066 A | * 1/1995 | Miyaji et al. .................. 310/90 |
| 5,729,404 A | * 3/1998 | Dunfield et al. ......... 360/99.08 |
| 5,768,051 A | * 6/1998 | Kora et al. ............... 360/99.08 |
| 5,844,748 A | * 12/1998 | Dunfield et al. ......... 360/99.08 |
| 5,880,543 A | * 3/1999 | Park .......................... 310/67 R |
| 6,005,746 A | * 12/1999 | Papst ....................... 360/98.07 |

FOREIGN PATENT DOCUMENTS

| DE | 35 42 542 | 6/1987 |
| DE | 38 39 731 | 6/1989 |
| DE | 39 18 958 | 3/1990 |
| DE | 196 44 755 | 5/1997 |
| JP | 7-208472 | * 8/1995 |

* cited by examiner

Primary Examiner—William Klimowicz
(74) Attorney, Agent, or Firm—The Maxham Firm

(57) ABSTRACT

A drive apparatus for hard disc memories with an integrated labyrinth seal and a motor to drive the rotor cap that has at least one hard memory disc fastened to it. Between a stationary shaft and the rotor cap at least two bearings are arranged which are separated from the space determined for storing the hard memory discs by labyrinth seals. In the design of the labyrinth seals, the rotor cap has in its lower/upper areas radially inwardly-directed annular flanges whose inside radial face forms an upper/lower seal gap of the labyrinth seal in connection with the stationary shaft. A separate upper/lower labyrinth seal is connected solidly to the rotor cap at a distance from the lower/upper seal gap, whose inner radial face forms an upper/lower seal gap in connection with the stationary shaft.

1 Claim, 4 Drawing Sheets

DRIVE APPARATUS FOR HARD DISC MEMORIES WITH AN INTEGRATED LABYRINTH SEAL

BACKGROUND

1. Field of the Invention

The invention is a drive apparatus for hard disk memories with an integrated labyrinth seal.

2. Description of the Related Art

An arrangement of the general type of this invention is known from German patent publication 30 49 334 C3, for example. In this known apparatus, a series of labyrinth gaps are designed, namely a first labyrinth gap in the upper area of a rotating shaft, which is fastened securely to a rotor cap, and also in the lower region across from a stationary support flange.

Due to existing manufacturing inexactness, it is very difficult to design such seals to be very long and narrow due to the dimensioning and arrangement of the labyrinth seal since the danger exists of the rotor cap colliding with the stationary parts of the support flange.

SUMMARY OF THE INVENTION

A primary purpose of the invention is to develop a drive apparatus of the above-named type such that with the same manufacturing accuracy—as with the state of the technology—considerably more narrow seal gaps can be achieved.

An important feature of the invention is that a bell-shaped rotor cap has an annular flange directed radially inward whose inwardly radial face forms the lower seal gap together with the stationary shaft, while a separate upper seal, a somewhat disk-shaped part, is solidly connected to the rotor cap at a distance from the lower seal gap and likewise forms an upper seal gap with its inward radial surface parallel to the shaft.

A considerable advantage arises from the technical theory provided in that the upper and lower seal gaps according to the invention are formed on very exactly machined surfaces on the stationary shaft. The advantage thus arises that only the shaft has to be exactly machined and is designed as a stationary shaft, while upper and lower seal gaps encompassing this stationary shaft are formed by seal surfaces from circular elements of the rotor cap directed radially inwardly.

The upper and lower seal gaps proposed here lie as close as possible radially inwardly to the shaft and thus have a very small diametric clearance. The gaps themselves have a dimension of approximately 10 to 20 µm (micrometers) and lie, as stated, at the maximum radial inward position in the entire arrangement, which was not the case in the state of the technology. The concept of "seal" should not be narrowly defined here. All seal constructions fall under this category, especially labyrinth seals, or cylindrical, barrel-shaped or other types of profiles or also flat annular seals having non-touching opposing seal surfaces.

In the state of the technology, the named seal gaps had a large radial separation from the rotating shaft which had the disadvantage that an out-of-round condition had to be smoothed out. Corresponding machining errors had a negative effect on the characteristics of motion to a great extent (due to the separation from the center of rotation) such that large seal gaps were required for safety reasons. This problem is obviated by the structure of the present invention.

In a preferred embodiment of the invention, it is provided that the rotor cap has an upper opening somewhat cylindrical opening into which the seal is fitted in a pressed seat so that the part of the seal on the outer radius lies against the inner wall of the opening in the rotor cap in a pressed seat (or also using adhesive) and thus is fastened solidly to the rotor cap. The surfaces of this seal directed radially inward form the upper seal gap in connection with the shaft on the inside.

In the same way, the rotor cap has a lower annular flange directed radially inward which also forms the lower seal gap with its radially inwardly directed surfaces and the shaft. The rotor cap also has inner housing space to house the stationary portion (stator) of the motor in a known fashion.

A further important advantage arises with the apparatus of the invention in that a simple assembly is possible. First, the shaft with the upper and lower ball bearings and the spacer in between is pre-assembled and pre-clamped so that the two ball bearings are tensioned against one another with no play. The ball bearings are tensioned by an external force (for example by a weight) against one another with no play and then are bonded to the shaft. The metal seal is then set on the pre-stressed and solidly held bearing arrangement and fastened, after which the rotor cap is clinched from below over the arrangement. The rotor cap is heated, giving it a larger inside diameter. When it cools the rotor cap sits against the pressed seat on the outer circumference of the seal. At the same time the lower edge of the lower ball bearing pushes against the radially inwardly-directed annular flange of the rotor cap so that this is aligned correctly with the shaft.

BRIEF DESCRIPTION OF THE DRAWING

The objects, advantages, and features of the invention will be more readily perceived from the following detailed description, when read in conjunction with the accompanying drawing, in which.

DETAILED DESCRIPTION OF THE PREFERRED EMBODIMENTS

Figure 1:
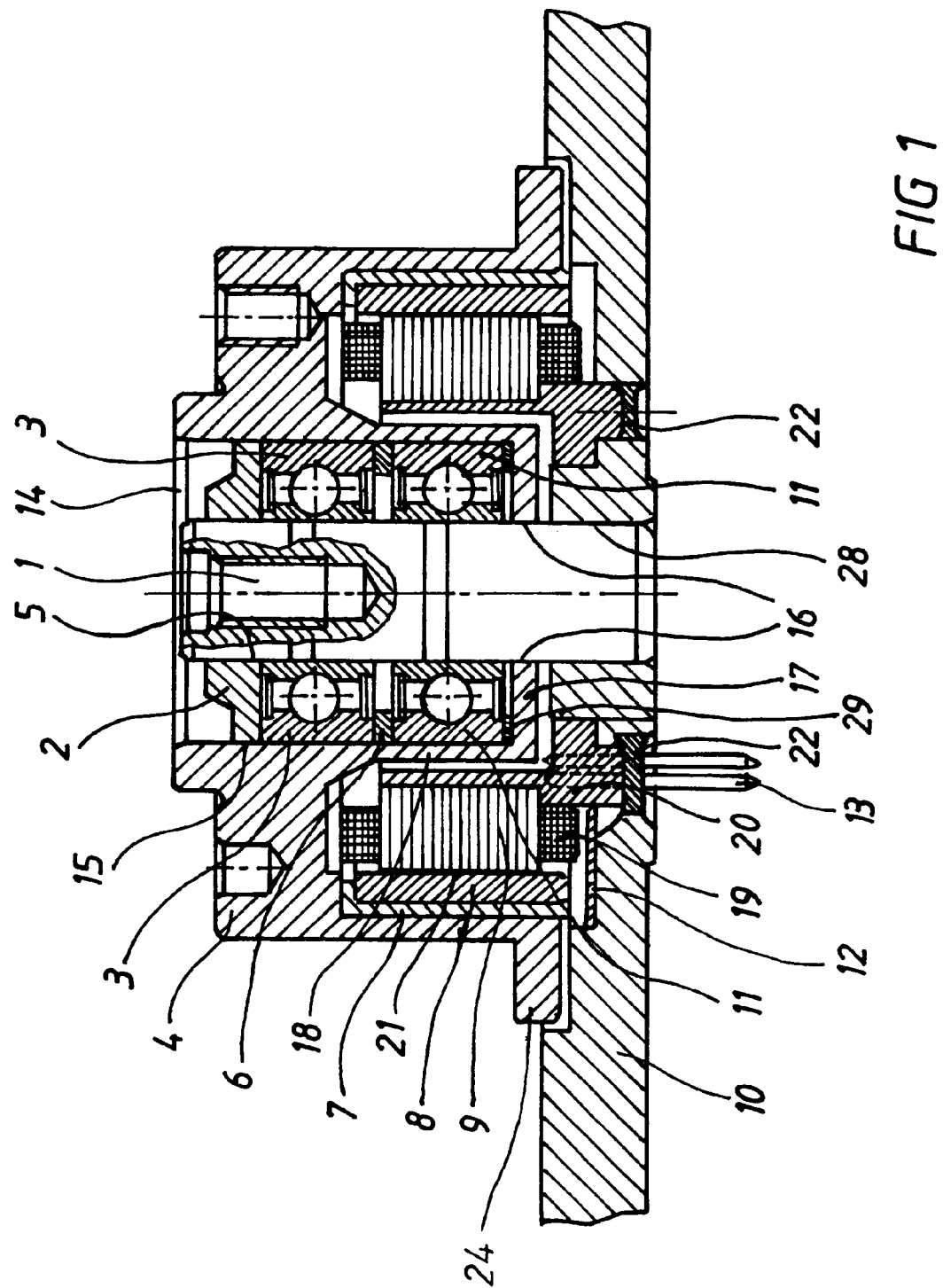
FIG. 1 is a section through a first embodiment of a drive arrangement in accordance with the invention.

With reference now to the drawing, and more particularly to FIG. 1, it is shown that two ball bearings 3, 11 are fastened to stationary shaft 1 and are separated from one another. The bearing assemblies can be pressed in or glued in. Instead of the labyrinth seal described as follows, cylindrical or barrel-type annular seals can be used. The inner annulus of the respective bearing 3,11 can be glued to the outer circumference of the shaft. A pressed seat can also be used. The respective outer annulus of bearing 3,11 is connected to the inner circumference of the rotor cap in a pressed seat. Instead of a pressed seat, a glued seat can also be provided.

Rotor cap 4 forms an upper cylindrical opening 14 through which an essentially disc-shaped, labyrinth seal 2, consisting of a metal, is inserted. The outer radial circumference of labyrinth seal 2 sits in the form of back-stop 15 in a pressed fit against the inner circumference of opening 14 of rotor cap 4, while the radially inwardly directed flange of labyrinth seal 2 forms upper seal gap 5 with the very finely machined outer circumference of shaft 1. Rotor cap 4 is designed somewhat as a hat and has a somewhat C-shaped cross section wherein outer vertical shank 23 (FIG. 2) blends into horizontal disc support flange 24 which forms seating surface 25 for the magnetic memory discs (not illustrated) that are connected to rotor cap 4.

It is important that rotor cap 4 be formed with housing 27 to receive a portion of the motor. The motor consists of stator 9 (FIG. 1) with associated stator winding 19 that is arranged above and below the stator stacked sheets. In a known fashion axial air gap 21 is formed in the direction radial to the rotating permanent ring magnets 8 which are connected to ground casing 7 which in turn is pressed in or glued in at the inner circumference of bell-shaped rotor cap 4. The named parts 7 and 8 are thus solidly connected to the inner circumference of rotor cap 4. Between upper and lower ball abearings 3,11, spacer 6 is also installed. Shaft 1 is pressed in or glued into opening 26 of support flange 10.

Further, carrier 20 is arranged in the support flange, which positions the stator stacked sheets and stator winding 19 radially and axially wherein rods 13 extend through carrier 20 as connection rods and the electric connection is provided the stator winding.

Sealing disc 12 is arranged at the support flange which is to prevent sealant 22 from penetrating into the motor. At the same time, sealing disc 12 serves as an isolator such that the connecting rods extending from stator winding 19 do not come into contact with the metallic parts of support flange 10.

Rotor cap 4 forms a horizontal, inwardly-directed annular flange 17 extending from inner vertical shank 18 which forms lower seal gap 16 of the labyrinth seal with its radially inwardly directed interior.

What is meaningful is that bearings 3,11 are sealed simply by seal gaps 5,16 according to the invention, but that the motor parts such as stator stacked sheets 9 or stator winding 19 do not have to be sealed from the outside in the direction of the magnetic memory discs. Care has been taken in the construction and assembly that the named parts are absolutely dust and particle-free since they have been appropriately washed and baked and thus introduce no foreign parts onto these motor parts. A key aspect of the invention lies in that only the contamination-producing parts, namely upper and lower bearings 3,11 are sealed with the respective seal gaps 5,16 and thus can provide very narrow seal gaps which also ensure an absolute deep seal against the smallest particles.

With this, air flow from the motor is practically eliminated since this flow is interrupted at lower seal gap 16 and upper seal gap 5 separated from the first (at points spaced from one another) and thus the motor itself is not penetrated by the air stream. In this way, all foreign particles which could come from the bearings are absolutely sealed by upper and lower seal gaps 5,16 and can no longer penetrate into the outer space.

At lower bearing 11 is bearing area 29 near radially inwardly directed annular flange 17 so that oil or grease emanating from the lower bearing downward is gathered up by bearing area 29 and kept there. The bearing sits on the bearing area 29 as stated previously.

Figure 2:
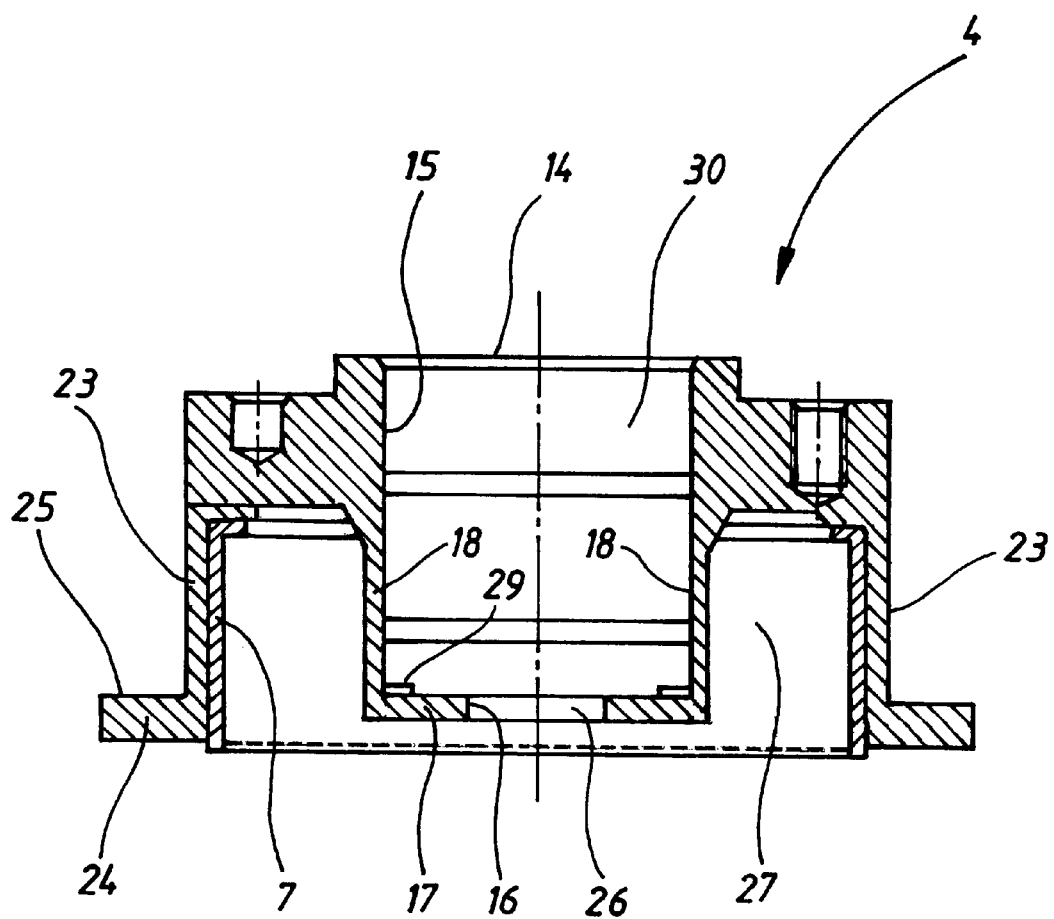
FIG. 2 is a section through the rotor cap of FIG. 1.

FIG. 2 shows the same parts as in FIG. 1, wherein rotor cap 4 is represented sectionally. It can also be seen here that the rotor cap has inner housing space 30 for housing of the ball bearings and that radially inwardly directed annular flange 17 with its faces forms lower seal gap 16. Further, it can be seen from FIG. 2 that radially below and inside in housing space 30 previously mentioned bearing area 29 serves as a sealing surface of the rotating edge of lower bearing 11.

It is also meaningful that radial outside housing area 27 used to house the motor portion can be used during manufacturing to clamp the entire rotor cap with all radial and critical axial surfaces at once in the production of the rotor cap.

Figure 3:
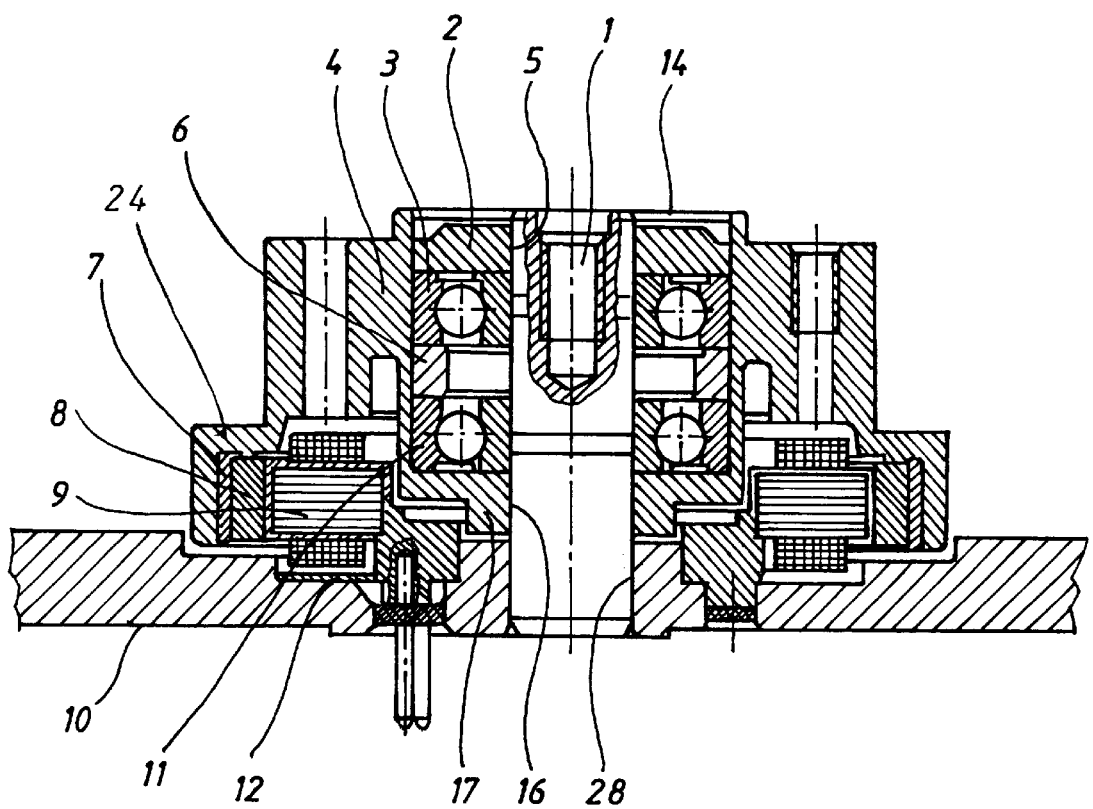
FIG. 3 is a section through a second embodiment of a drive arrangement of the invention.
Figure 4:
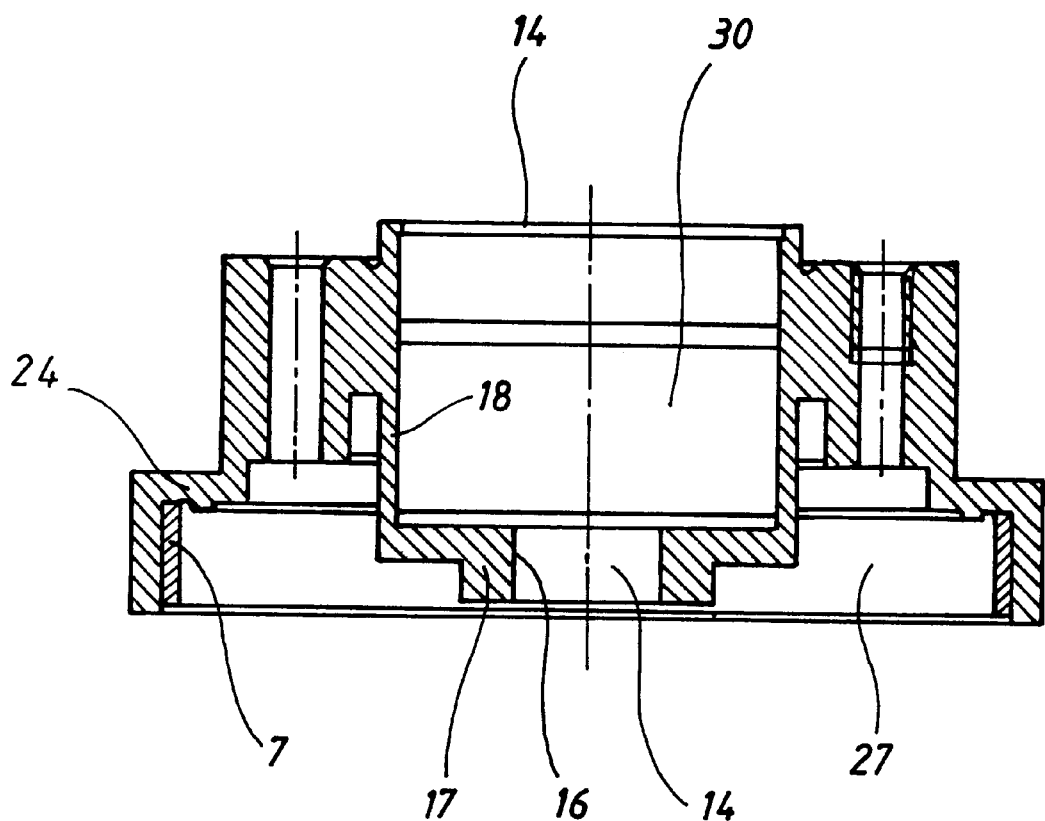
FIG. 4 is a section through the rotor cap of FIG. 3.

FIGS. 3 and 4 show a modified design wherein the same numbering is used for the same parts. In contrast to the design according to FIGS. 1 and 2, rotor cap 4 is designed somewhat differently wherein no narrow inwardly directed annular flange 17 exists, but there is a staged annular flange 17 which turns into a longer axial part from a more narrow radial outside part. This longer axial part then forms lower seal gap 16 over a larger axial length at the shaft. Upper labyrinth seal 2 has an equally large axial length for upper seal gap 5 but is chosen somewhat larger in its remaining dimensions in order to fill out opening 14.

Bearing 3,11 in the FIGS. 3 and 4 embodiment are larger than the bearings shown in FIG. 1 so that there are likewise differences here in construction which are not important as far as the functioning of the subject of the invention goes.

It is cautioned that the directional details given here such as "up" and "down" are only examples. Thus, a kinematic reversal of the existing description can cause annular flange 17 of the rotor cap to not be at the indicated location, but in place of labyrinth seal 2 shown above. Labyrinth seal 2 would be arranged in place of annular flange 17 in reversed fashion.

It is only meaningful that radially inwardly directed, axial seal gaps between rotating parts of the rotor cap and the associated surfaces of the shaft be designed. It is equally valid whether labyrinth seal 2 is situated on top or below and reversed, or whether an annular flange with inwardly directed seal gaps is arranged below or in place of the labyrinth seal.

In view of the above description, it is likely that those skilled in the art will envision modifications and improvements to this invention. The invention is limited only by the spirit and scope of the accompanying claims, with due consideration being given to a reasonable range of equivalents.

What is claimed is:

1. A disc drive apparatus for driving a disc in rotation, the apparatus comprising:
    a shaft;
    a bearing;
    a gap of approximately 10 to 20 micrometers; and
    a rotor cap rotationally coupled to the shaft by the bearing, the rotor cap comprising a disc-seating portion structured to receive the disc and a flange located to surround a portion of the shaft, with the flange being unitary with the disc-seating portion, wherein the whole flange is located below the bearing, and
    a second flange fixed to the rotor cap and located above the bearing, the second flange surrounding a portion of the shaft and being proximate to the shaft, wherein said flange is directed radially inward to the shaft such that one portion of the flange which is proximate to the shaft, together with the shaft, provide said gap;
        wherein a proximate portion of the second flange, which is proximate to the shaft is wider than a distal portion of the second flange which is located away from the shaft.

* * * * *